(12) United States Patent
Yagasaki et al.

(10) Patent No.: US 6,672,984 B2
(45) Date of Patent: Jan. 6, 2004

(54) BELT FOR CONTINUOUSLY VARIABLE TRANSMISSION

(75) Inventors: Toru Yagasaki, Saitama (JP); Shigeru Kanehara, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/073,049

(22) Filed: Feb. 12, 2002

(65) Prior Publication Data

US 2002/0119855 A1 Aug. 29, 2002

(30) Foreign Application Priority Data

Feb. 13, 2001 (JP) ........................................ 2001-035881

(51) Int. Cl.[7] .............................. F16G 5/16; F16G 1/22
(52) U.S. Cl. ...................... 474/242; 474/201; 474/240
(58) Field of Search ................................. 474/242, 240, 474/201, 248, 237, 245, 244, 243, 246, 247, 238

(56) References Cited

U.S. PATENT DOCUMENTS

| | | | | |
|---|---|---|---|---|
| 4,826,473 A | * | 5/1989 | Miyawaki | 474/240 |
| 5,439,422 A | * | 8/1995 | Smeets | 474/242 |
| 6,270,437 B1 | * | 8/2001 | Yoshida et al. | 474/248 |
| 6,334,830 B1 | * | 1/2002 | Yagasaki et al. | 474/242 |
| 6,342,020 B1 | * | 1/2002 | Aoyama | 474/242 |
| 6,464,606 B2 | * | 10/2002 | Brandsma et al. | 474/242 |

FOREIGN PATENT DOCUMENTS

| | | | | |
|---|---|---|---|---|
| EP | 0 367 620 A1 | 5/1990 | | |
| EP | 0 626 526 A1 | 11/1994 | | |
| EP | 1 018 608 A1 | 7/2000 | | |
| JP | 01-98733 A | * | 4/1989 | 474/242 |
| JP | 7-12177 | 1/1995 | | |
| JP | 2617784 | 3/1997 | | |

* cited by examiner

Primary Examiner—Marcus Charles
(74) Attorney, Agent, or Firm—Arent Fox Kintner Plotkin & Kahn, PLLC

(57) ABSTRACT

In a belt for a continuously variable transmission, the relationship of $\theta NH < \theta Y$ is established between the following two angles: (i) an angle $\theta Y$ formed between a straight line drawn from a lower end of one of left and right pulley-abutment faces of a metal element to an outer end of the other of the left and right lower ear surfaces and a straight line drawn from a point of the intersection of a straight line drawn downwards from the point with an outer peripheral surface of a metal ring assembly to the point; and (ii) an angle $\theta NH$ formed between a tangent line drawn from the point onto a projection and a tangent line drawn from the point onto a recess of the metal element.

5 Claims, 9 Drawing Sheets

BELT FOR CONTINUOUSLY VARIABLE TRANSMISSION

BACKGROUND OF THE INVENTION

1. Field of the Invention

The present invention relates to a belt for a continuously variable transmission, which is reeved around a drive pulley and a driven pulley to transmit a driving force in a state in which a metal ring assembly has been supported in a ring slot defined in a large number of metal elements, and the adjacent metal elements have been positioned by fitting of a projection and a recess with each other.

2. Description of the Prior Art

In a belt for a continuously variable transmission described in Japanese Patent Application Laid-open No. 7-12177, the rolling of a metal element short of a location where it bites into a pulley from a chord of the metal belt is restricted by limiting the clearance between an outer peripheral surface of a metal ring assembly and a lower ear surface, thereby preventing the occurrence of the wearing and a reduction in transmitting efficiency due to the incorrect meshing engagement of the metal elements with the pulley.

In a belt for a continuously variable transmission described in Japanese Patent No. 2,617,784, the length of a pulley-abutment face of a metal element put into abutment against a V-groove of a pulley and the shape of a radially inner end of the pulley-abutment face are defined based on the relationship between an angle of inclination of the V-groove of the pulley and a pitch width of the metal element (a lateral width on a pitch line), so that even when the metal element bits into the pulley in a rolling state, a saddle face of the metal element does not exceeds a reference height, thereby preventing an excessively large load being applied to a metal ring assembly.

However, the belt described in Japanese Patent Application Laid-open No. 7-12177 suffers from a problem that when the driving of the belt has been conducted for a long time, a particular portion of an outer peripheral surface of the metal ring assembly, which strongly abuts against the lower ear surface, is damaged due to the fatigue. This results in a reduction in durability of the entire metal belt, because the rolling of the metal element is restricted by the abutment of the outer peripheral surface of the metal ring assembly and the lower ear surface of the metal element against each other.

The belt described in Japanese Patent No. 2,617,784 suffers from the problem that when the driving of the belt has been conducted for a long time, a particular portion of an outer peripheral surface of the metal ring assembly, which strongly abuts against the saddle face, is damaged due to the fatigue. This results in a reduction in durability of the entire metal belt, because the rolling of the metal element is restricted by the abutment of the inner peripheral surface of the metal ring assembly and the saddle face of the metal element against each other.

SUMMARY OF THE INVENTION

Accordingly, it is an object of the present invention to enhance the durability of the metal ring assembly by inhibiting the rolling of the metal element without recourse to the abutment of the metal ring assembly and a ring slot against each other.

To achieve the above object, according to a first aspect and feature of the present invention, there is provided a belt for a continuously variable transmission, comprising a large number of metal elements, each of which is provided with a front main face and a rear main face capable of being brought into contact with an opposing face of an adjacent metal element, a ring slot provided between a saddle face connecting the main faces to each other and a lower ear surface. A projection is provided on one of the front and rear main faces to protrude therefrom, and a recess is formed on the other of the front and rear main faces and into which the projection can be loosely fitted. The belt is adapted to be reeved around a drive pulley and a driven pulley to transmit a driving force between both of the pulleys in a state in which the large number of metal elements are supported via a metal ring assembly in the ring slot, wherein when the metal element is rolled relative to the metal ring assembly, the outer peripheral surface of the projection comes into abutment against the inner peripheral surface of the recess, before the inner peripheral surface of the metal ring assembly comes into abutment against the saddle face and the outer peripheral surface of the metal ring assembly comes into abutment against the lower ear surface.

With the above arrangement, when the metal element immediately upstream of the metal element positioned correctly the moment it bites into V-grooves of the pulley is being rolled relative to the downstream metal element, the lower ear surface of the downstream metal element can be prevented from coming into abutment against the outer peripheral surface of the metal ring assembly by restricting the maximum angle of rolling of the downstream metal element relative to the upstream metal element which are fitted with each other via their projection and recess, thereby enhancing the durability of the metal ring assembly. When left and right pulley-abutment faces bite into the left and right V-grooves incorrectly in a state in which the downstream metal element is being rolled, the downstream metal element can be restored to a correct attitude under the action of a load generated by the abutment of the projection and the recess against each other. At this time, the lower ear surface of the downstream metal element is not put into abutment against the outer peripheral surface of the metal ring assembly and hence, it is possible to prevent a reduction in durability of the metal ring assembly.

According to a second aspect and feature of the present invention, the relationship of $\theta NH < \theta Y$ is established between the following two angles: (1) an angle $\theta Y$ formed between a straight line drawn from a lower end of one of the left and right pulley-abutment faces of the metal element to a laterally outer end of the other of the left and right lower ear surfaces and a straight line drawn from the point of intersection of a straight line drawn down radially inwards from the laterally outer end of the other lower ear surface with the outer peripheral surface of the metal ring assembly to the lower end of the one pulley-abutment face; and (2) an angle $\theta NH$ formed between a tangent line drawn from the lower end of the one pulley-abutment face of the metal element onto the outer peripheral surface of the projection and a tangent line drawn from the lower end of the one pulley-abutment face of the metal element onto the inner peripheral surface of the recess.

With the above arrangement, the angle $\theta Y$ formed between the straight line drawn from the lower end of one of the left and right pulley-abutment faces of the metal element to the laterally outer end of the other of the left and right lower ear surfaces and the straight line drawn from the point of intersection of the straight line drawn down radially inwards from the laterally outer end of the other lower ear surface with the outer peripheral surface of the metal ring assembly to the lower end of the one pulley-abutment face is set larger than the angle $\theta NH$ formed between the tangent line drawn from the lower end of the one pulley-abutment face of the metal element onto the outer peripheral surface of the projection and the tangent line drawn from the lower end of the one pulley-abutment face of the metal element onto the inner peripheral surface of the recess. Therefore, the outer peripheral surface of the projection can reliably come into abutment against the inner peripheral surface of the recess, before the inner peripheral surface of one of the left and right ends of the metal ring assembly contacts the saddle face and the outer peripheral surface of the other end of the metal ring assembly comes into abutment against the lower ear surface.

According to a third aspect and feature of the present invention, there is provided a belt for a continuously variable transmission, comprising a large number of metal elements, each of which is provided with a front main face and a rear main face capable of being brought into contact with each other. A ring slot is provided between a saddle face connecting the main faces to each other and a lower ear surface, a projection is provided on one of the front and rear main faces to protrude therefrom, and a recess is formed on the other of the front and rear main faces, into which the projection can be loosely fitted. The belt is adapted to be reeved around a drive pulley and a driven pulley to transmit a driving force between both of the pulleys in a state in which the large number of metal elements have been supported via a metal ring assembly in the ring slot. The relationship of θNH<θY is established between the following two angles: (1) an angle θY formed between a straight line drawn from a lower end of one of the left and right pulley-abutment faces of the metal element to a laterally outer end of the other of the left and right lower ear surfaces and a straight line drawn from a point of intersection of a straight line drawn down radially inwards from the laterally outer end of the other lower ear surface with the outer peripheral surface of the metal ring assembly to the lower end of the one pulley-abutment face; and (2) an angle θNH formed between a tangent line drawn from the lower end of the one pulley-abutment face of the metal element onto the outer peripheral surface of the projection and a tangent line drawn from the lower end of the one pulley-abutment face of the metal element onto an inner peripheral surface of the recess.

With the above arrangement, the angle θY formed between the straight line drawn from the lower end of one of the left and right pulley-abutment faces of the metal element to the laterally outer end of the other of the left and right lower ear surfaces and the straight line drawn from the point of intersection of the straight line drawn down radially inwards from the laterally outer end of the other lower ear surface with the outer peripheral surface of the metal ring assembly to the lower end of the one pulley-abutment face is set larger than the angle θNH formed between the tangent line drawn from the lower end of the one pulley-abutment face of the metal element onto the outer peripheral surface of the projection and the tangent line drawn from the lower end of the one pulley-abutment face of the metal element onto the inner peripheral surface of the recess. Therefore, the outer peripheral surface of the projection can reliably come into abutment against the inner peripheral surface of the recess, before the inner peripheral surface of one of the left and right ends of the metal ring assembly contacts the saddle face and the outer peripheral surface of the other end of the metal ring assembly comes into abutment against the lower ear surface.

Thus, when the metal element immediately upstream of the metal element positioned correctly the moment it has bitten into V-grooves of the pulley is being rolled relative to the downstream metal element, the lower ear surface of the downstream metal element can be prevented from being put into abutment against the outer peripheral surface of the metal ring assembly, thereby enhancing the durability of the metal ring assembly. When the left and right pulley-abutment faces bite into the left and right V-grooves incorrectly in a state in which the downstream metal element is being rolled, the downstream metal element can be restored to a correct attitude under the action of a load generated by the abutment of the projection and the recess against each other. At this time, the lower ear surface of the downstream metal element is not put into abutment against the outer peripheral surface of the metal ring assembly and hence, it is possible to prevent a reduction in durability of the metal ring assembly.

According to a fourth aspect and feature of the present invention, the metal element has a pair of the left and right ring slots, which are supported on a pair of the left and right metal ring assemblies, respectively.

According to a fifth aspect and feature of the present invention, the projection and the recess are provided on a centerline of the metal element.

The above and other objects, features and advantages of the invention will become apparent from the following description of the preferred embodiment taken in conjunction with the accompanying drawings.

BRIEF DESCRIPTION OF THE DRAWINGS

FIGS. 1 to 9 show an embodiment of the present invention, wherein

FIG. 1 is a skeleton diagram of a power transmitting system of a vehicle provided with a continuously variable transmission;

FIG. 2 is a perspective view of a portion of a metal belt;

FIG. 3 is a front view of a metal element;

FIG. 4 is an enlarged view of a portion indicated by 4 in FIG. 3;

FIG. 5 is a view taken in a direction of an arrow 5 in FIG. 3;

FIG. 6 is a diagrammatic illustration of the metal belt reeved around a drive pulley and a driven pulley;

FIG. 8 is a graph showing a region in which θY>θNH is established; and

FIG. 9 is a graph showing a region in which $CLY > (LY^2/LNH \times LYH) \times CLNH$ is established.

DESCRIPTION OF THE PREFERRED EMBODIMENT

The present invention will now be described by way of an embodiment with reference to the attached drawings.

Figure 2:
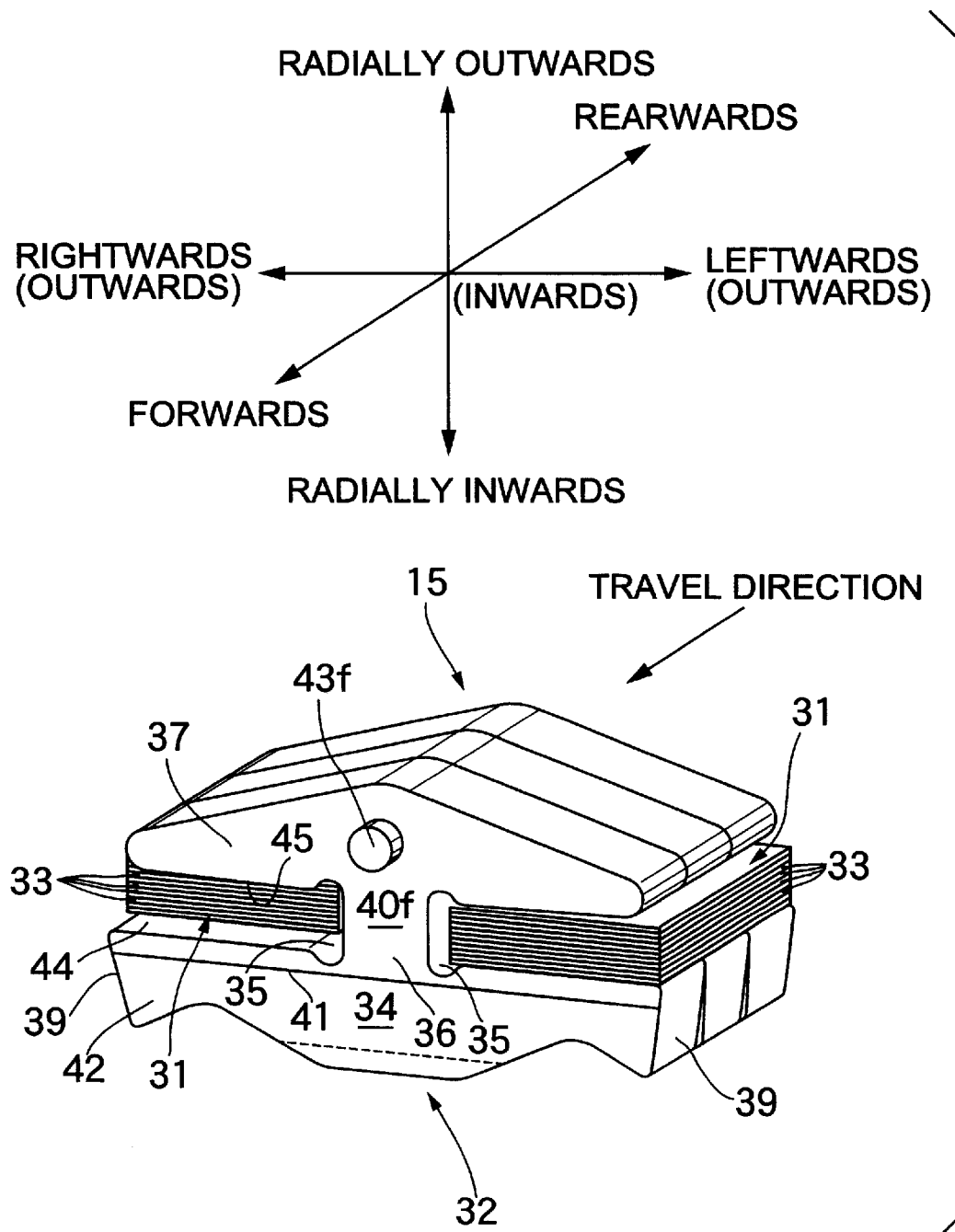

The definition of forward and backward directions, leftward and rightward directions and radially outward and inward directions of a metal element used in the present embodiment is shown in FIG. 2.

Figure 1:
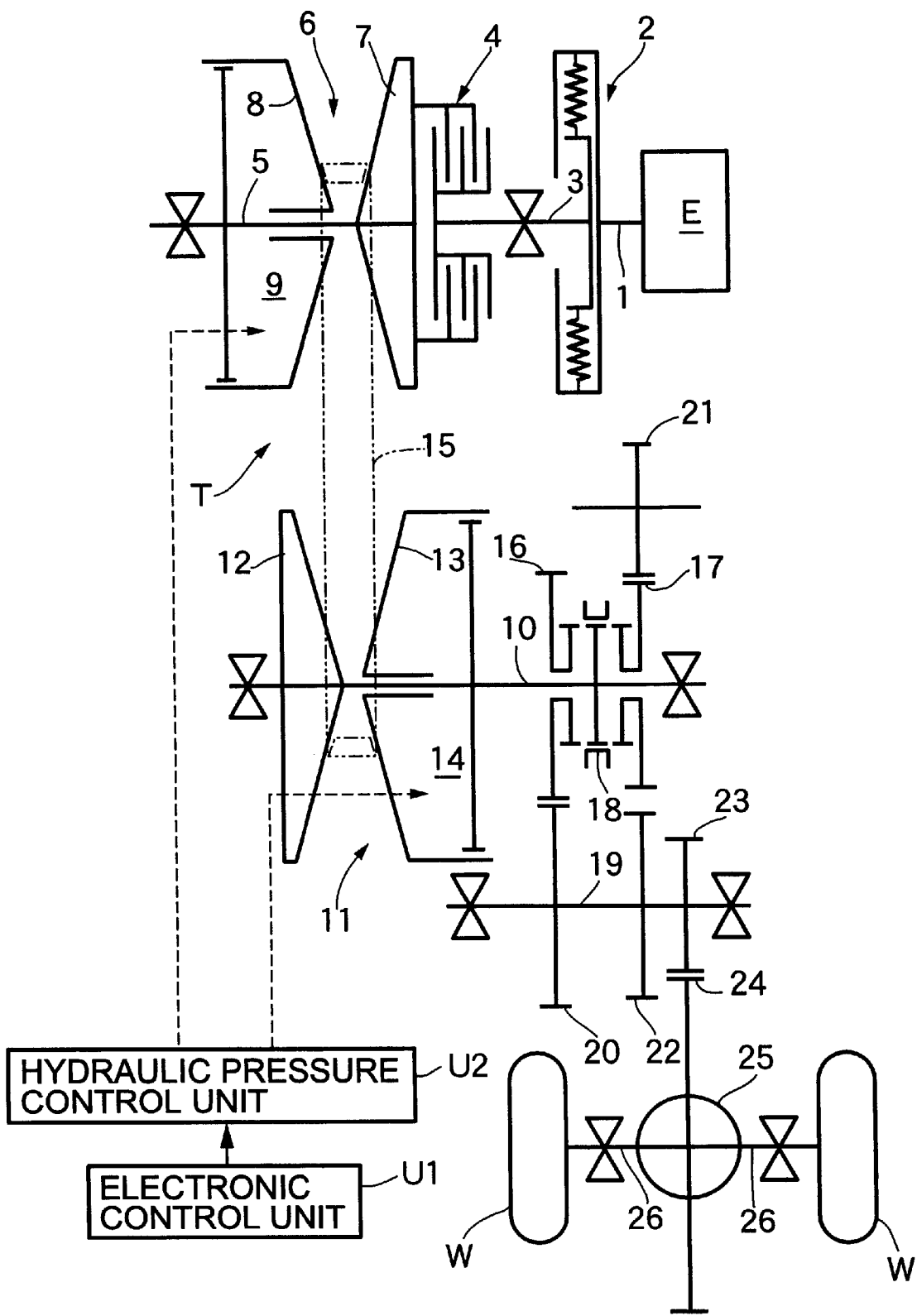

FIG. 1 shows the schematic structure of a metal belt-type continuously variable transmission T mounted on an automobile. An input shaft 3 connected through a damper 2, to the crankshaft 1 of an engine E, is connected through a starting clutch 4 to a driving shaft 5 of the metal belt-type continuously variable transmission T. A drive pulley 6 mounted on the drive shaft 5 comprises a stationary pulley half 7 secured to the driving shaft 5, and a movable pulley half 8 capable of being moved toward and away from the stationary pulley half 7. The movable pulley half 8 is biased toward the stationary pulley half 7 by hydraulic pressure applied to an oil chamber 9.

A driven pulley 11 mounted on a driven shaft 10 disposed in parallel to the driving shaft 5, comprises a stationary pulley half 12 secured to the driven shaft 10, and a movable pulley half 13 capable of being moved toward and away from the stationary pulley half 12. The movable pulley half 13 is biased toward the stationary pulley half 12 by hydraulic pressure applied to an oil chamber 14. A metal belt 15 is reeved between the driving pulley 6 and the driven pulley 11 and comprises a large number of metal elements 32 supported on a pair of left and right metal ring assemblies 31, 31 (see FIG. 2). Each of the metal ring assemblies 31, 31 comprises a plurality of metal rings 33, for example, twelve (12), laminated on one another.

A forward drive gear 16 and a reverse drive gear 17 are relatively rotatably supported on the driven shaft 10. The forward drive gear 16 and the reverse drive gear 17 can be coupled selectively to the driven shaft 10 by a selector 18. A forward driven gear 20 meshed with the forward drive gear 16 and a reverse driven gear 22 meshed with the reverse drive gear 17 through a reverse idling gear 21 are secured to an output shaft 19 which is disposed in parallel to the driven shaft 10.

The rotation of the output shaft 19 is input to a differential 25 through a final drive gear 23 and a final driven gear 24, and is transmitted therefrom through left and right axles 26, 26 to driven wheels W, W.

The driving force of the engine E is transmitted to the driven shaft 10 through the crankshaft 1, the damper 2, the input shaft 3, the starting clutch 4, the drive shaft 5, the drive pulley 6, the metal belt 15 and the driven pulley 11. When a forward travel range is selected, the driving force of the driven shaft 10 is transmitted to the output shaft 19 through the forward drive gear 16 and the forward driven gear 20, thereby allowing the vehicle to travel forwards. When a rearward travel range is selected, the driving force of the driven shaft 10 is transmitted to the output shaft 19 through the reverse drive gear 17, the backward idling gear 21 and the reverse driven gear 22, thereby allowing the vehicle to travel rearwards.

At that time, the change gear ratio of the metal belt-type continuously variable transmission T is regulated continuously by controlling the hydraulic pressure applied to the oil chamber 9 of the drive pulley 6 and the oil chamber 14 of the driven pulley 11 of the metal belt-type continuously variable transmission T by a hydraulic pressure control unit U2 which is operated by a command from an electronic control unit U1. More specifically, if the hydraulic pressure applied to the oil chamber 14 of the driven pulley 11 is increased relative to the hydraulic pressure applied to the oil chamber 9 of the drive pulley 6, the groove width of the driven pulley 11 is reduced, leading to an increased effective radius, and correspondingly, the groove width of the drive pulley 6 is increased, leading to a reduced effective radius. Therefore, the change gear ratio of the metal belt type continuous variable transmission T is varied continuously toward "LOW". On the other hand, if the hydraulic pressure applied to the oil chamber 9 of the drive pulley 6 is increased relative to the hydraulic pressure applied to the oil chamber 14 of the driven pulley 11, the groove width of the drive pulley 6 is reduced, leading to an increased effective radius, and correspondingly, the groove width of the driven pulley 11 is increased, leading to a reduced effective radius. Therefore, the change gear ratio of the metal belt-type continuous variable transmission T is varied continuously toward "OD".

Figure 3:
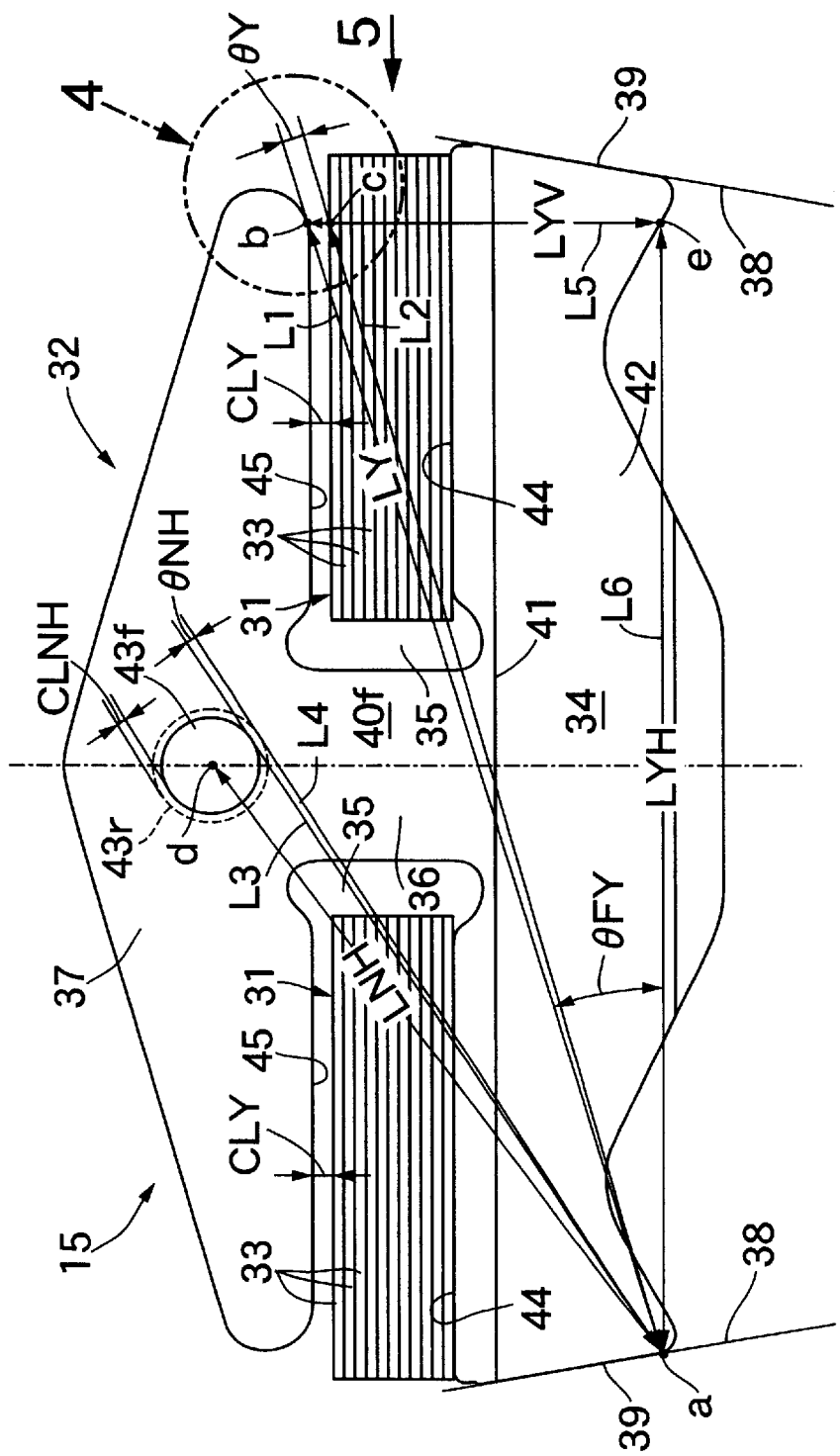
Figure 4:
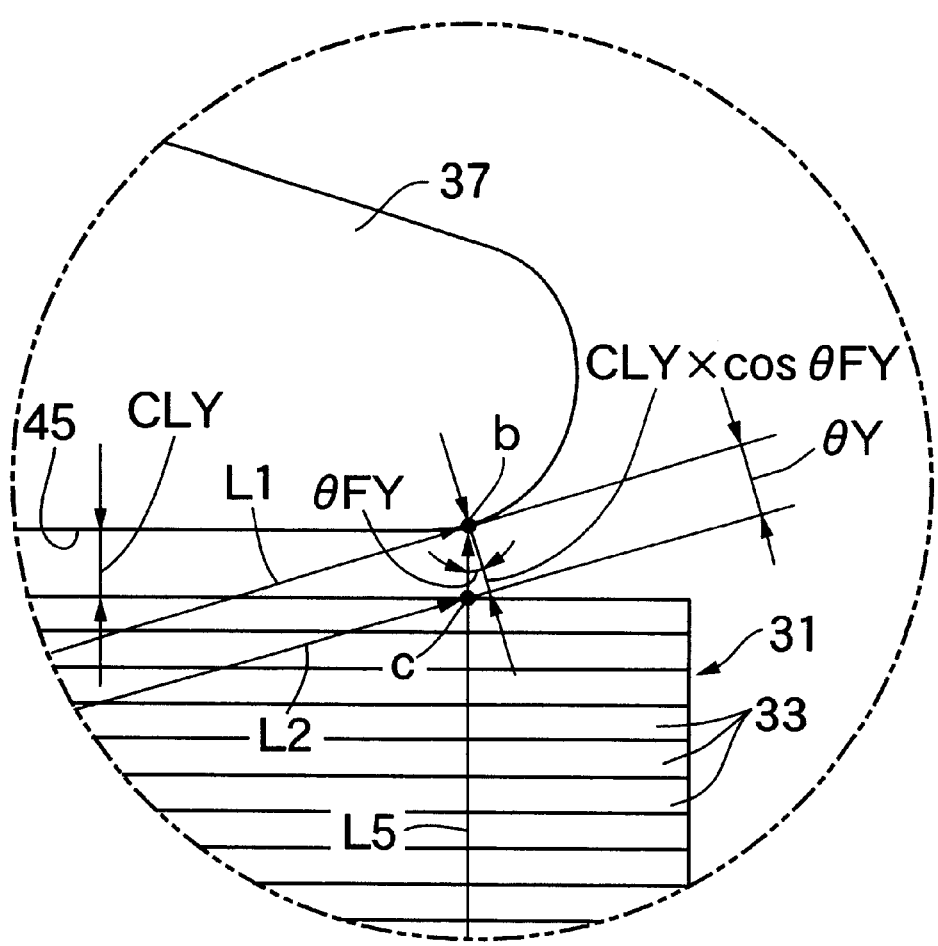
Figure 5:
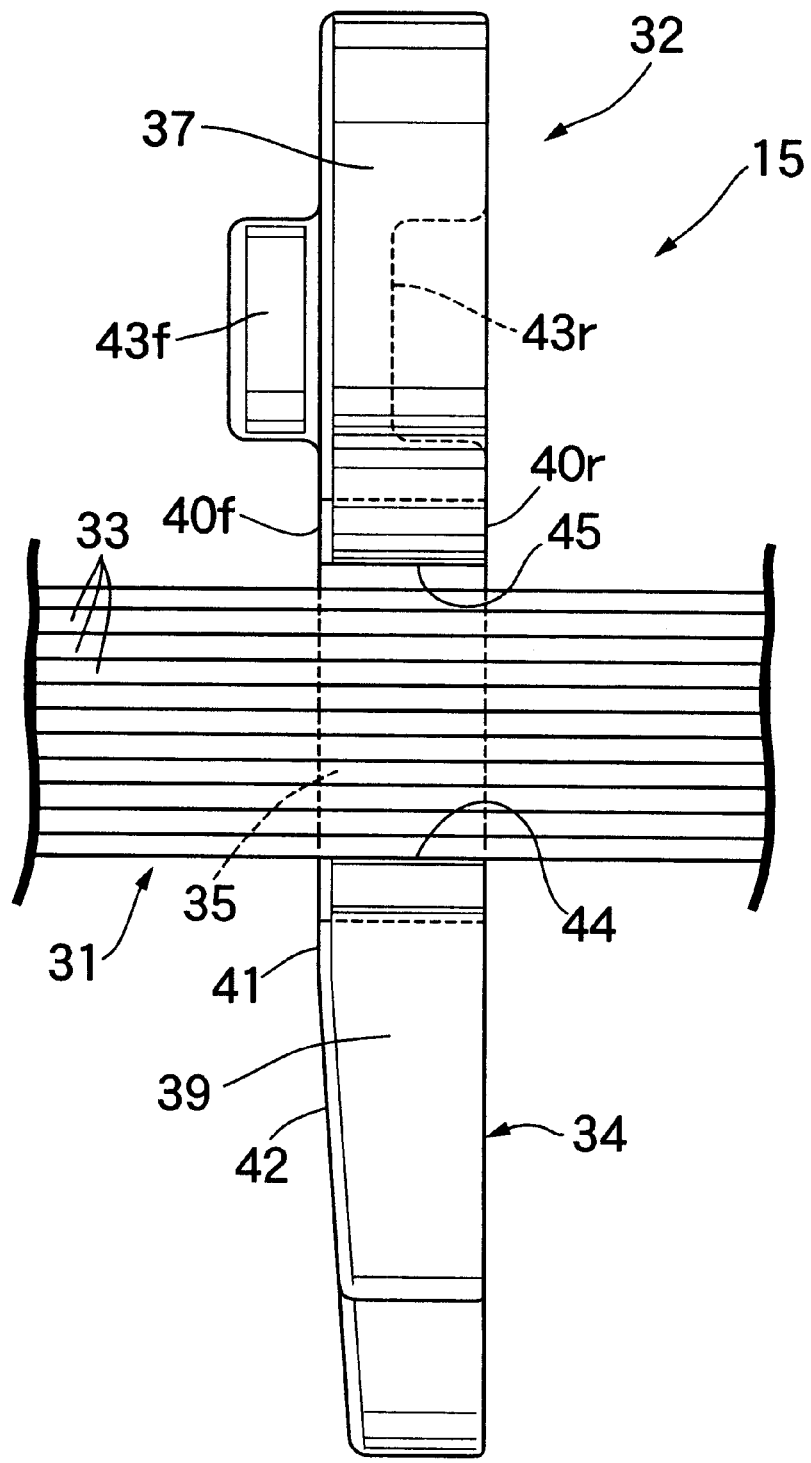

As shown in FIGS. 2 to 4, each of the metal elements 32, which is formed from a metal plate by punching, includes a substantially trapezoidal element body 34, a neck 36 located between a pair of left and right ring slots 35, 35 which hold the metal ring assemblies 31, 31, and a substantially triangular ear 37 connected to an upper portion of the element body 34 through the neck 36. The element body 34 has a pair of abutment faces 39, 39 formed at its laterally opposite ends and capable of abutting against V-grooves 38, 38 (see FIG. 3) in the drive pulley 6 and the driven pulley 11. The metal element 32 has a pair of front and rear main faces 40$f$, 40$r$ formed on front and rear sides in the direction of travel in such a manner that they are perpendicular to the direction of travel and parallel to each other, and has an inclined face 42 formed on the front side in the direction of travel below the front main face 40$f$, with a laterally extending locking edge interposed therebetween. Further, a projection 43$f$ and a recess 43$r$ capable of being loosely fitted with a corresponding recess or projection on an adjacent metal element, are formed on the front surface (the front main face 40$f$) and the rear surface (the rear main face 40$r$) of the ear 37 to couple the longitudinally adjacent metal elements 32, 32 to each other. Radially inner edges and radially outer edges of the ring slots 35, 35 are called saddle faces 44, 44 and lower ear faces 45, 45, respectively, and inner peripheral surfaces of the metal ring assemblies 31, 31 abut against the saddle faces 44, 44.

As can be seen from FIGS. 3 and 4, a straight line drawn from a point a at a lower end of the left pulley-abutment face 39 of the metal element 32 to a point b at a laterally outer end of the right lower ear face 45 is represented by L; a point of intersection of a straight line L5 drawn down radially inwards from the point b with the outer peripheral surface of the metal ring assembly 31 is defined as a point c; and an angle formed by a straight line L2 interconnecting the point a and the point b with respect to the straight line L1 is represented by θY. If an angle formed by a tangent line L3 drawn on an outer peripheral surface of the projection 43$f$ from the point a and a tangent line L4 drawn on an inner peripheral surface of the recess 43$r$ from the point a is represented by θNH, then the following relation (1) is established:

$$\theta NH < \theta Y \tag{1}$$

This means that when the two adjacent metal elements 32 are rolling relative to each other, the projection 43$f$ of one of the metal elements 32 comes into abutment against the recess 43$r$ of the other metal element 32 before the point c on the outer peripheral surface of the right metal ring assembly 31 comes into abutment against the point b on the right lower ear surface 45, whereby the relative rolling of the metal elements is restricted to prevent the point c on the outer peripheral surface of the right metal ring assembly 31 from coming into abutment against the point b on the right lower ear surface 45.

If a distance between a point d as the center of each of the projection 43$f$ and the recess 43$r$ and the point a is represented by LNH, and a clearance between the outer peripheral surface of the projection 43$f$ and the inner peripheral surface of the recess 43$r$ is represented by CLNH, the angle θNH is given according to the following equation:

$$\theta NH = CLNH/LNH \tag{2}$$

If a clearance between the outer peripheral surface of the metal ring assembly 31 and the lower ear surfaces 45, 45 is represented by CLY; the length of the straight line L1 interconnecting the points a and b is represented by LY; the point of intersection of a straight line L6 drawn rightwards from the point a with the straight line L5 drawn downwards from the point b is defined as a point e; the distance between the points a and e is represented by LYH, and the angle formed by the straight lines L1 and L6 is represented by θFY, the angle θY is given according to the following equation:

$$\theta Y = CLY \times \cos \theta FY / LY \tag{3}$$

cos θFY is LYH/LY and hence, the following equation is provided:

$$\theta Y = CLY \times LYH/LY^2 \qquad (4)$$

If this equation is solved with regard to CLY using the equation (2), the following equation is provided:

$$CLY = (LY^2/LNH \times LYH) \times CLNH \qquad (5)$$

Figure 6:
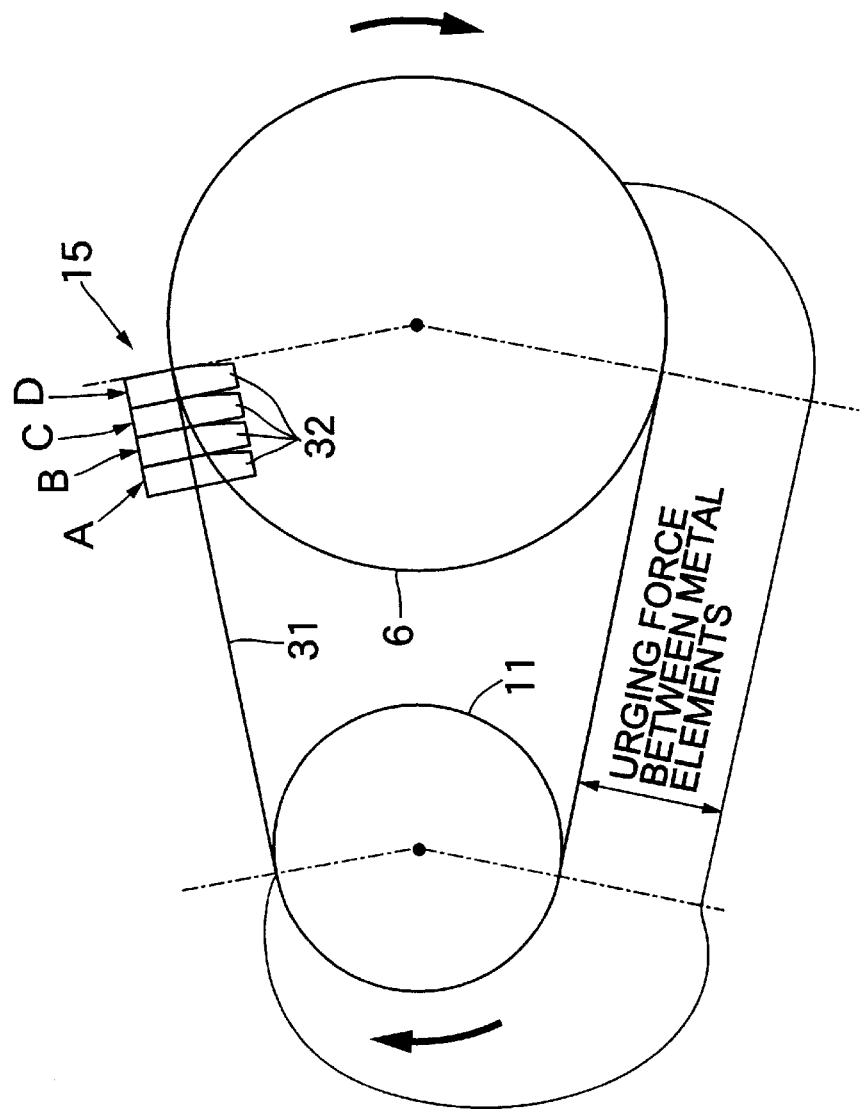

FIG. 6 diagrammatically shows the metal belt 15 wound around the drive pulley 6 and the driven pulley 11, with the four metal elements 32 indicated by A, B, C and D which are shown in an area downstream of a chord moved from the driven pulley 11 toward the drive pulley 6. D indicates the element 32 just biting into the drive pulley 6, and the metal elements 32 indicated by B, C and D are those upstream of the metal element 32 indicated by D. In the chord moved from the driven pulley 11 toward the drive pulley 6, namely, in the chord on a loosened side where the driving force is not transmitted, the metal elements 32 are in states in which they are not stabilized in their attitudes and are liable to be rolled, because the adjacent metal elements 32 apply no urging force to each other.

Figure 8:
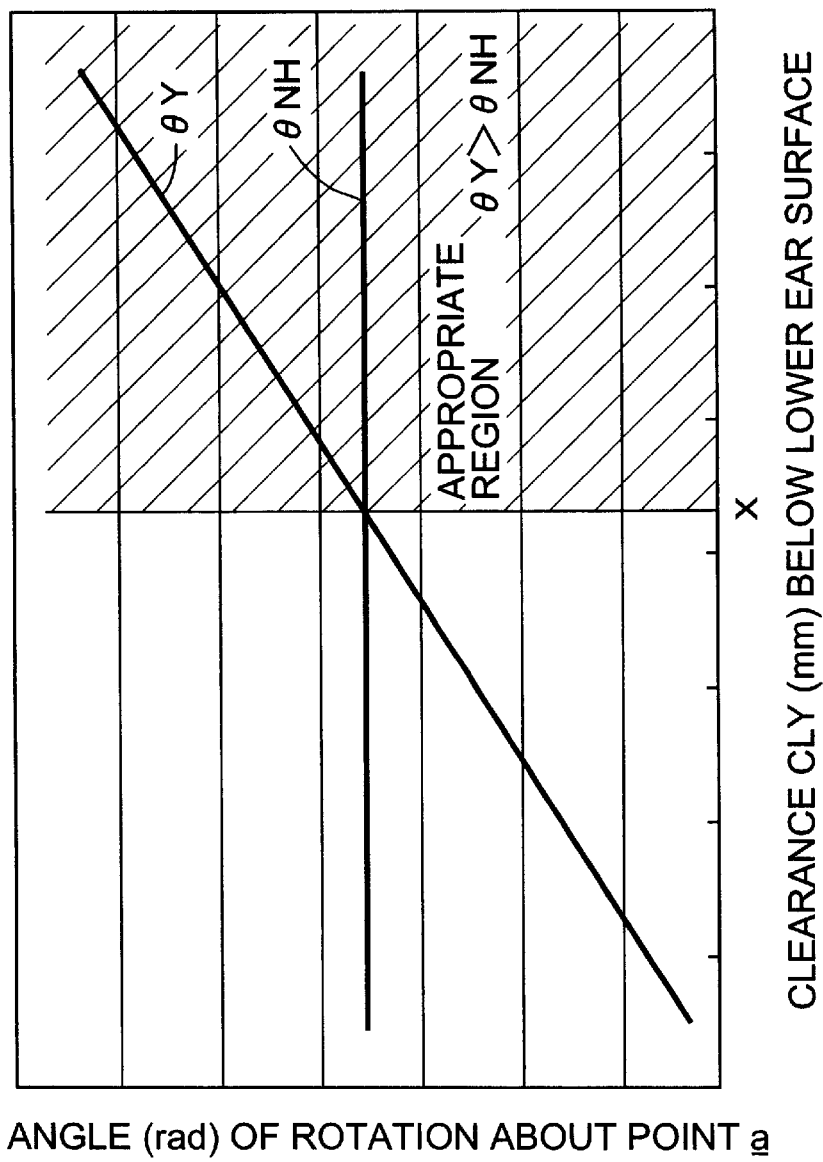

The graph shown in FIG. 8 indicates results of the calculation of the angles θY and θNH using CLY as a parameter under a condition where CLNH, LNH, LY and LYH have been fixed. θNH is a constant value irrespective of CLY, but θY is increased linearly from 0 with an increase in CLY. In a region of CLY>x wherein oblique lines are drawn, a relation, θNH<θY is established, and when the two adjacent metal elements 32 are rolled relative to each other, the projection 43f of the metal element 32 comes into abutment against the recess 43r of the adjacent element 32 before the point c on the outer peripheral surface of the metal ring assembly 31 comes into abutment against the point b on the lower ear surface 45.

Figure 9:
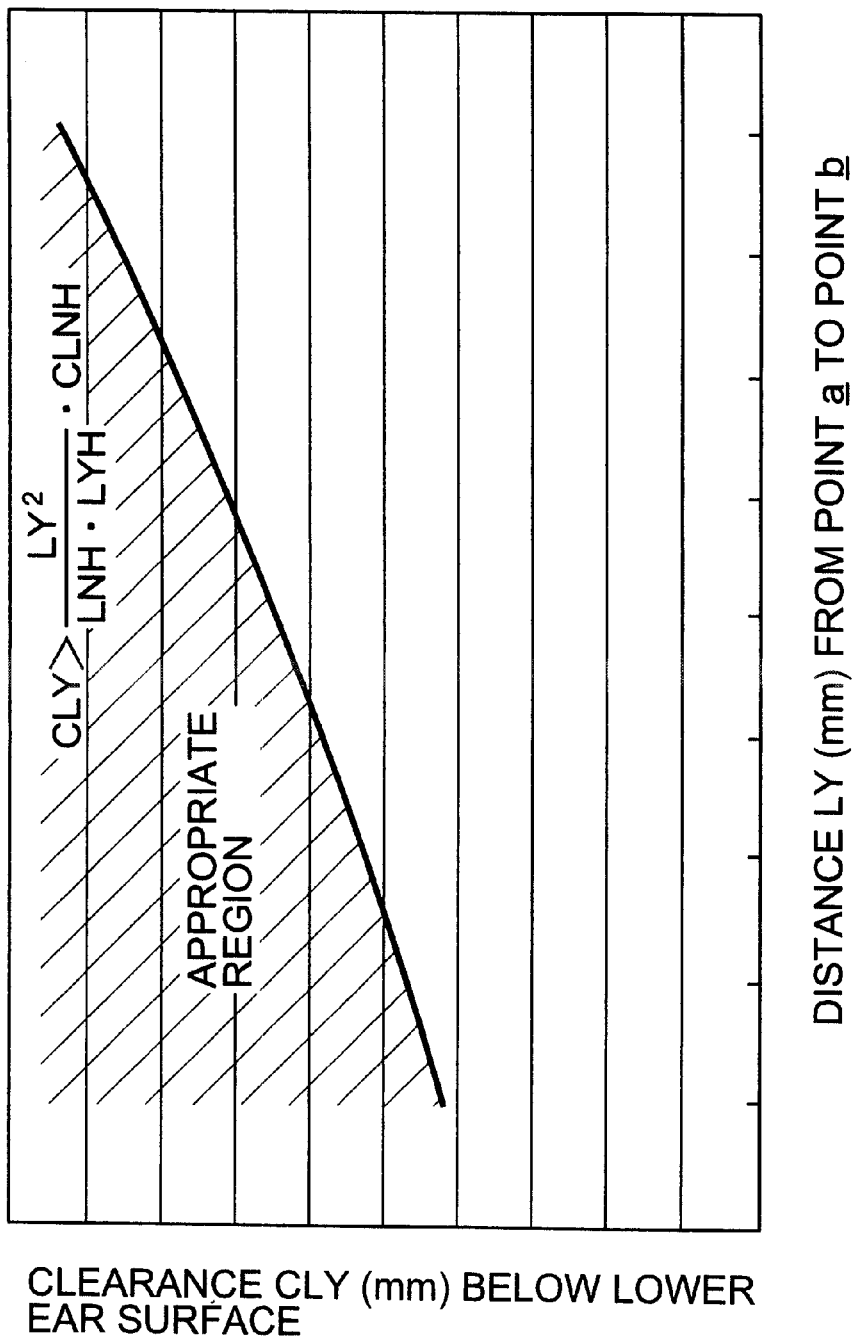

The graph shown in FIG. 9 indicates a relation of CLY=(LY²/LNH×LYH)×CLNH in the equation (5) with LY and CLY as parameters under the condition where CLNH and LYH have been fixed. CLY is a secondary function of LY, and in a region where oblique lines are drawn, θNH<θY in the equation (1) is established, and the projection 43f of the metal element 32 comes into abutment against the recess 43r of the adjacent element 32 before the point c on the metal ring assembly 31 comes into abutment against the point b on the lower ear surface 45.

FIGS. 7A to 7D are diagrammatic illustrations showing states of the four metal elements indicated by A to D in FIG. 6 being viewed from the upstream side in the direction of travel. In the state shown in FIG. 7A, the metal element A lies at a location displaced to an upstream side at a distance corresponding to the three metal elements from the metal element D just biting into the pulley and hence, can be moved freely in a range three times as wide as the clearance CNH between the projection 43f and the recess 43r, based on the metal element D biting into the pulley with its position restricted. In addition, no urging force is applied to the metal elements A to D as described above and hence, there is a possibility that the metal element A is moved downwards under the action of a force of gravity, whereby the lower ear surfaces 45, 45 comes into abutment against the outer peripheral surfaces of the metal ring assemblies 31, 31. However, no load other than the weight is basically applied to the metal element A and hence, there is no possibility that the outer peripheral surfaces of the metal ring assemblies 31, 31 are damaged due to the abutment against the lower ear surfaces 45, 45.

Figure 7A:
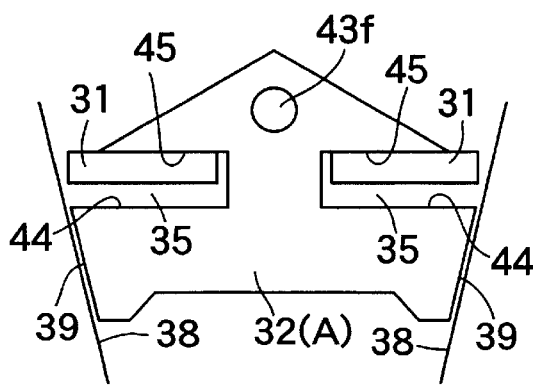
FIGS. 7A to 7D are operation-explaining diagrams showing the behavior of a metal ring assembly.
Figure 7C:
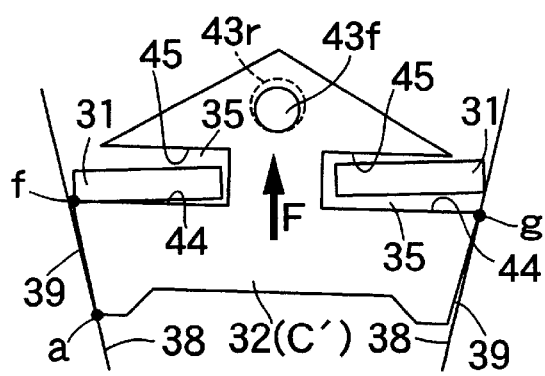
Figure 7B:
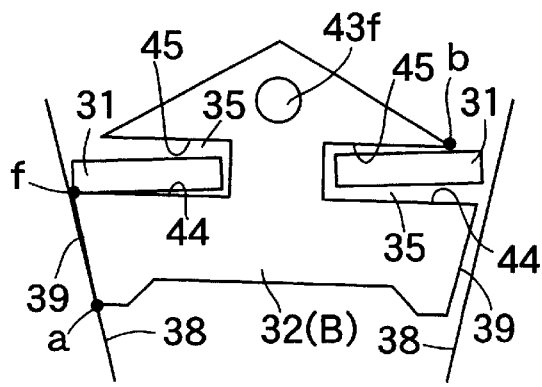
Figure 7D:
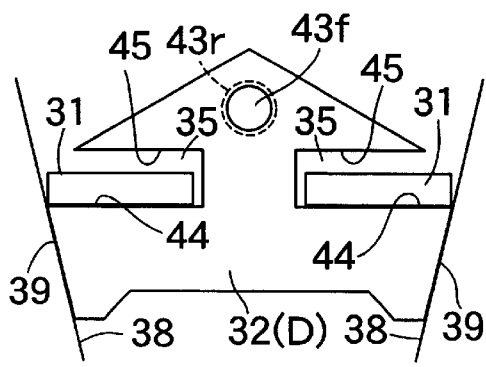
Figure 7C:
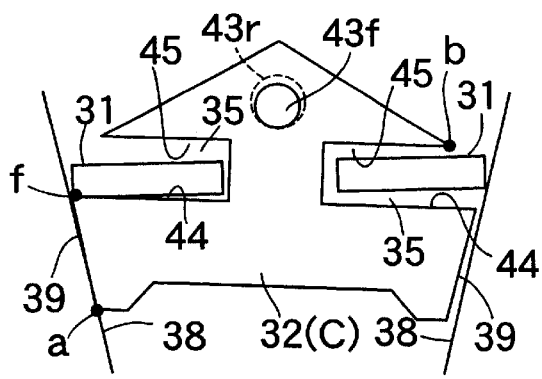

FIG. 7B shows the state in which the metal element B has been rolled in a clockwise direction to approach the pulley, whereby the point a at the lower end of the left pulley-abutment face 39 comes into abutment against the V-groove 38 of the pulley, and a point f at a left end of the left saddle face 44 comes into abutment against the inner peripheral surface of the left metal ring assembly 31. At this time, the metal element B lies at a location displaced to an upstream side at a distance corresponding to the two metal elements from the metal element D just biting into the pulley and hence, can be moved relatively freely in a range twice as large as the clearance CNH between the projection 43f and the recess 43r, based on the metal element D biting into the pulley with its position restricted, and there is a possibility that the point b on the right lower ear surface 45 comes into abutment against the outer peripheral surface of the right metal ring assembly 31. In this state, however, the metal element B is merely in abutment against the left V-groove 38 of the pulley and can be moved relatively freely. Therefore, even if the point b on the lower ear surface 45 comes into abutment against the outer peripheral surface of the right metal ring assembly 31, there is no possibility that a large load is applied to the abutting portion to exert an adverse effect to the durability of the metal ring assembly 31.

The metal element C shown in FIG. 7C lies at a location immediately upstream of the metal element D (see FIG. 7D) just biting into the pulley. In this case, the position of the metal element C is restricted with its projection 43f fitted into the recess 43r of the metal element D positioned in a correct attitude with its pulley-abutment faces 39, 39 abutting against the left and right V-grooves 38, 38 of the pulley, and the maximum rolling angle of the metal element C relative to the metal element D is restricted to the value θNH. As a result, the point b on the right lower ear surface 45 is reliably prevented from coming into abutment against the outer peripheral surface of the right metal ring assembly 31. The degree of freedom of movement of metal element C adjoining the metal element D with its position restricted in the V-grooves 38, 38 of the pulley is limited to a large extent. Therefore, if the point b on the lower ear surface 45 comes into abutment against the outer peripheral surface of the metal ring assembly 31, a large influence is exerted to the durability of the metal ring assembly 31, but the durability of the metal ring assembly 31 is enhanced by avoiding such abutment.

In a special case for the state shown in FIG. 7C, a state may be generated in which the point a at the lower end of the left pulley-abutment face 39 is in abutment against the left V-groove 38 of the pulley; a point g at the upper end of the right pulley-abutment face is in abutment against the right V-groove 38 of the pulley; and the left end of the left saddle face 44 is in abutment against the inner peripheral surface of the left metal ring assembly 31, as shown in FIG. 7C'. In this case, the metal element C' is restrained with the left and right pulley-abutment faces 39, 39 strongly clamped between the left and right V-grooves 38, 38, but when the metal element C' reaches to the position assumed by the metal element D in a short time, it is restored to its correct attitude. During this time, the metal element C' must restore its position against a strong frictional force provided between the pulley-abutment faces 39, 39 and the V-grooves 38, 38, and a load F for restoring the position can be generated by the abutment of the recess 43r of the metal element D with the projection 43f of the metal element C'. At this time, if the point b on the lower ear surface 45 abuts against the outer peripheral surface of the metal ring assembly 31, it is necessary to transit the load F from the metal ring assembly 31 to the lower ear surface 45, and there is a possibility that a large load may be applied to the metal ring assembly 31 to exert an extremely adverse effect to the durability of the metal ring assembly 31.

The metal belt 15 according to the embodiment includes the pair of metal ring assemblies 31, 31, but the present invention may be applicable to a metal belt including a single metal ring assembly. In this case, the number of ring slots in a metal element is one, and a pair of lower ear surfaces opposed to a single saddle face extend toward each other from left and right opposite ends of the ring slot. A pair of ears provided at left and right ends of the metal element are provided with a projection and a recess on a front main face and a rear main face thereof, respectively.

In addition, in the embodiment, the projection 43*f* is formed on the front main face 40*f*, and the recess 43*r* is formed on the rear main face 40*r*, but the positional relation between the projection 43*f* and the recess 43*r* may be reversed.

Although the embodiment of the present invention has been described in detail, it will be understood that the present invention is not limited to the above-described embodiment, and various modifications in design may be made without departing from the spirit and scope of the invention defined in the claims.

What is claimed is:

1. A belt for a continuously variable transmission having a drive pulley and a driven pulley, the belt comprising
    a plurality of metal elements, each metal element having a front main face and a rear main face for being brought into contact with an adjacent metal element, a saddle face connecting the main faces to each other, at least one ring slot in the saddle face, a lower ear surface, a projection extending from one of the front and rear main faces, a recess formed on the other of the front and rear main faces, wherein the projection from an adjacent metal member can be loosely fitted therein, and left and right pulley-abutment faces;
    at least one metal ring assembly positioned in the ring slot;
    wherein the belt is adapted to be reeved around the drive pulley and the driven pulley to transmit a driving force between the pulleys in a state wherein the plurality of metal elements are supported by the metal ring assembly in the ring slot; and
    wherein when one of the metal elements is rolled relative to the metal ring assembly about a lower end of one of said pulley-abutment faces of the one metal element, the outer peripheral surface of the projection comes into abutment against the inner peripheral surface of the recess of an adjacent metal element, before the inner peripheral surface of the metal ring assembly comes into abutment against the saddle face and the outer peripheral surface of the metal ring assembly comes into abutment against the lower ear surface.

2. A belt for a continuously variable transmission according to claim 1, wherein the relationship of $\theta NH < \theta Y$ is established between the following two angles: (i) an angle $\theta Y$ formed between a straight line drawn from said lower end of the one pulley-abutment face of the one metal element to a laterally outer end of the other of the left and right lower ear surfaces thereof and a straight line drawn from a point of intersection of a straight line drawn down radially inwards from the laterally outer end of the other lower ear surface with the outer peripheral surface of the metal ring assembly to the lower end of the one pulley-abutment face; and (ii) an angle $\theta NH$ formed between a tangent line drawn from the lower end of the one pulley-abutment face of the metal element onto an outer peripheral surface of the projection and a tangent line drawn from the lower end of the one pulley-abutment face of the metal element onto an inner peripheral surface of said recess.

3. A belt for a continuously variable transmission having a drive pulley and a driven pulley, the belt comprising
    a plurality of metal elements, each metal element having a front main face and a rear main face for being brought into contact with an adjacent metal element, a saddle face connecting the main faces to each other, at least one ring slot in the saddle face, a lower ear surface, a projection extending from one of the front and rear main faces, a recess formed on the other of the front and rear main faces, wherein the projection from an adjacent metal member can be loosely fitted therein, and left and right pulley-abutment faces;
    at least one metal ring assembly positioned in the ring slot;
    wherein the belt is adapted to be reeved around the drive pulley and the driven pulley to transmit a driving force between the pulleys in a state wherein the plurality of metal elements are supported by the metal ring assembly in the ring slot; and wherein the relationship of $\theta NH < \theta Y$ is established between the following two angles: (i) an angle $\theta Y$ formed between a straight line drawn from a lower end of one of said left and right pulley-abutment faces of the one metal element to a laterally outer end of the other of the left and right lower ear surfaces thereof and a straight line drawn from a point of intersection of a straight line drawn down radially inwards from the laterally outer end of the other lower ear surface with the outer peripheral surface of the metal ring assembly to the lower end of the one pulley-abutment face; and (ii) an angle $\theta NH$ formed between a tangent line drawn from the lower end of the one pulley-abutment face of the metal element onto an outer peripheral surface of the projection and a tangent line drawn from the lower end of the one pulley-abutment face of the metal element onto an inner peripheral surface of said recess.

4. A belt for a continuously variable transmission according to any one of claims 1 to 3, wherein the at least one ring slot is a pair of the left and right ring slots and wherein the at least one ring assembly is a pair of left and right ring assemblies, whereby the metal elements are supported on the pair of the left and right metal ring assemblies, respectively.

5. A belt for a continuously variable transmission according to any one of claims 1 to 3, wherein the projection and the recess of each metal element are located on a centerline of the metal element.

* * * * *